(12) United States Patent
Kanazawa et al.

(10) Patent No.: US 12,473,614 B2
(45) Date of Patent: Nov. 18, 2025

(54) TUNGSTEN WIRE AND SAW WIRE

(71) Applicant: Panasonic Intellectual Property Management Co., Ltd., Osaka (JP)

(72) Inventors: Tomohiro Kanazawa, Osaka (JP); Yoshihiro Iguchi, Osaka (JP); Naoki Kohyama, Osaka (JP); Atsushi Shimada, Osaka (JP); Kenshi Tsuji, Osaka (JP); Yui Nakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 390 days.

(21) Appl. No.: 17/414,442

(22) PCT Filed: Nov. 18, 2019

(86) PCT No.: PCT/JP2019/045112
§ 371 (c)(1),
(2) Date: Jun. 16, 2021

(87) PCT Pub. No.: WO2020/137255
PCT Pub. Date: Jul. 2, 2020

(65) Prior Publication Data
US 2022/0098708 A1 Mar. 31, 2022

(30) Foreign Application Priority Data

Dec. 26, 2018 (JP) ................. 2018-243134

(51) Int. Cl.
*C22C 27/04* (2006.01)
*B21C 1/00* (2006.01)
(Continued)

(52) U.S. Cl.
CPC .............. *C22C 27/04* (2013.01); *B21C 1/003* (2013.01); *B21C 9/00* (2013.01); *C22F 1/18* (2013.01); *C22C 2200/04* (2013.01)

(58) Field of Classification Search
CPC ...................................... C22C 27/04
See application file for complete search history.

(56) References Cited

U.S. PATENT DOCUMENTS

| | | | | |
|---|---|---|---|---|
| 1,082,933 A | * | 12/1913 | Coolidge | ................ C22C 1/045 75/229 |
| 2011/0319931 A1 | * | 12/2011 | Esaki | ..................... A61B 17/06 420/432 |

(Continued)

FOREIGN PATENT DOCUMENTS

| CN | 108687981 A | 10/2018 |
|---|---|---|
| CN | 108858837 A | 11/2018 |

(Continued)

OTHER PUBLICATIONS

Manel Rodríguez Ripoll, "Reduction of tensile residual stresses during the drawing process of tungsten wires", Materials Science and Engineering: A, vol. 527, Issues 13-14, 2010, pp. 3064-3072 (Year: 2010).*

(Continued)

*Primary Examiner* — Keith Walker
*Assistant Examiner* — Catherine P Smith
(74) *Attorney, Agent, or Firm* — GREENBLUM & BERNSTEIN, P.L.C.

(57) ABSTRACT

A tungsten wire contains tungsten or a tungsten alloy. An average width of surface crystal grains in a direction perpendicular to an axis of the tungsten wire is at most 76 nm. The tungsten wire has a tensile of at least 4800 MPa, and a diameter of at most 100 μm.

5 Claims, 12 Drawing Sheets

(51) Int. Cl.
B21C 9/00 (2006.01)
C22F 1/18 (2006.01)

(56) References Cited

U.S. PATENT DOCUMENTS

| | | | | |
|---|---|---|---|---|
| 2018/0281231 | A1* | 10/2018 | Kanazawa | ............. B28D 5/007 |
| 2018/0326517 | A1 | 11/2018 | Kanazawa et al. | |
| 2018/0326519 | A1 | 11/2018 | Kanazawa et al. | |

FOREIGN PATENT DOCUMENTS

| | | | | |
|---|---|---|---|---|
| CN | 109591210 | A | 4/2019 | |
| JP | 5578852 | B2 | 8/2014 | |
| JP | 2014-169499 | A | 9/2014 | |
| JP | 59-54416 | A | 7/2016 | |
| JP | 6249319 | B1 * | 12/2017 | ................ B22F 5/12 |
| JP | 2018-167390 | A | 11/2018 | |

OTHER PUBLICATIONS

Q. Wei, "Effect of low-temperature rolling on the tensile behavior of commercially pure tungsten", Materials Science and Engineering: A, vol. 491, Issues 1-2, 2008, pp. 62-69. (Year: 2008).*

Qiu, Nn., Zhang, Y., Zhang, C. et al. Tensile properties of tungsten-rhenium wires with nanofibrous structure. Int J Miner Metall Mater 25, 1055-1059 (2018) (Year: 2018).*

H.S. Lin, Y.C. Hsu, C.C. Keh, J. Mater. Process. Technol., 201 (2008), pp. 128-132 (Year: 2008).*

International Search Report (including English Language Translation), mailed Feb. 18, 2020 by the Japan Patent Office (JPO), in International Application No. PCT/JP2019/045112.

Chinese Office Action, including English Language Search Report, dated Nov. 29, 2021 by the China National Intellectual Property Administration, in Chinese Patent Application No. 201980081218.5.

"Ultrasonic Cold Drawn Tungsten Wire Process", including English Language Translation, Shanghai Nonferrous Metal Research Institute, 1981-1982.

Chinese Office Action (included English Language Translation of Search Report), dated Oct. 25, 2022, for the corresponding Chinese Patent Application No. 202111219066.6.

Takayuko Fujii et al., "Effect of Dopants on the Secondary Recrystallization Grain Growth in Hot-Rolled Tungsten Sheet" (including English Language Translation, Tungsten Molybdenum Material, vol. 3, Issue 3, Dec. 31, 1991.

Stephen W. H. Yih et al., "Tungsten Sources, Metallurgy, Properties, and Applications", Plenum Press, New York, New York, pp. 214-215, 1979.

Hiroyuki Seto, "Wire Drawing Processing Technique for Processing-resistant Tungsten Wire" (including English Language Translation), Journal of the JSTP, vol. 39, No. 447, pp. 349-352, Apr. 1998.

Website of Nippon Tungsten Co., Ltd (including English Language Translation), 2006, (https://www.nittan.co.jp/products/tungsten-noreikanatuenkakou.html).

German Office Action, mailed Jun. 30, 2022, by the German Patent Office, for the corresponding German Patent Application No. 11 2019 006 427.4.

* cited by examiner

TUNGSTEN WIRE AND SAW WIRE

TECHNICAL FIELD

The present invention relates to a tungsten wire and a saw wire.

BACKGROUND ART

Medical needles including a tungsten alloy wire having a high tensile strength with an increased alloy ratio to tungsten have conventionally been known (see, for example, Patent Literature (PTL) 1). PTL 1 discloses that a tungsten alloy wire having a diameter of 0.10 mm has a maximum tensile strength of 4459.0 N/mm$^2$ (=MPa).

CITATION LIST

Patent Literature

[PTL 1] Japanese Unexamined Patent Application Publication No. 2014-169499

SUMMARY OF INVENTION

Technical Problem

Tungsten that has a small diameter and a higher tensile strength than a tensile strength of tungsten of conventional techniques has been required for effective use in various areas such as saw wires, screen printing meshes, etc. in addition to medical needles. Tungsten is chemically more stable and has a higher elastic modulus and a higher melting point than a piano wire which has the greatest strength as a metal wire. Such tungsten has great industrial potential.

In view of the above, an object of the present invention is to provide a tungsten wire and a saw wire each having a higher tensile strength than a general tensile strength of a piano wire as well as a smaller diameter.

Solution to Problem

In order to achieve the above-described object, a tungsten wire according to an aspect of the present invention contains tungsten or a tungsten alloy. In the tungsten wire, an average width of surface crystal grains in a direction perpendicular to an axis of the tungsten wire is at most 76 nm, a tensile strength of the tungsten wire is at least 4800 MPa, and a diameter of the tungsten wire is at most 100 μm.

In addition, a tungsten wire according to an aspect of the present invention contains tungsten or a tungsten alloy. In the tungsten wire, an average crystal grain size in a cross section perpendicular to an axis of the tungsten wire is at most 0.16 μm, the average crystal grain size in the cross section is smaller in a periphery portion than in a center portion by at least 5%, the periphery portion being outside the center portion in the cross section, a tensile strength of the tungsten wire is at least 4800 MPa, and a diameter of the tungsten wire is at most 100 μm.

In addition, a saw wire according to an aspect of the present invention includes the above-described tungsten wire.

Advantageous Effects of Invention

The present invention makes it possible to provide a tungsten wire and a saw wire each having a higher tensile strength than a general tensile strength of a piano wire as well as a smaller diameter.

DESCRIPTION OF EMBODIMENTS

Figure 1:
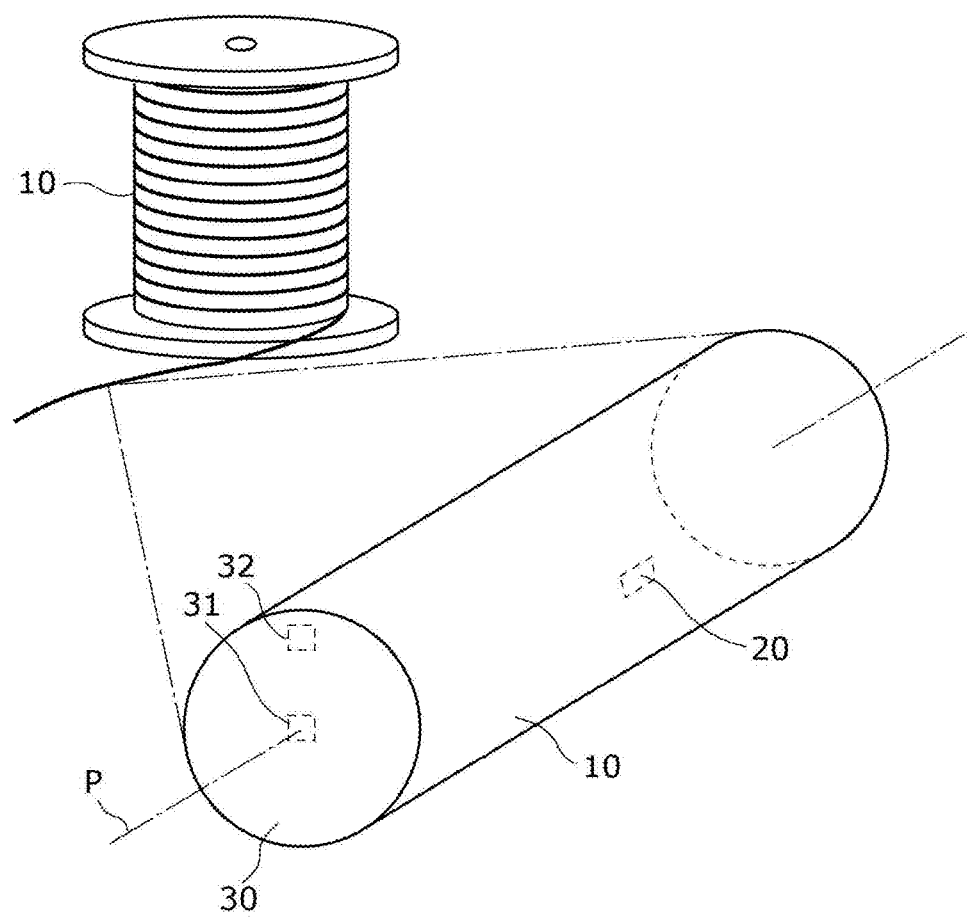
FIG. 1 is a perspective view schematically illustrating a tungsten wire according to an embodiment.
Figure 2A:
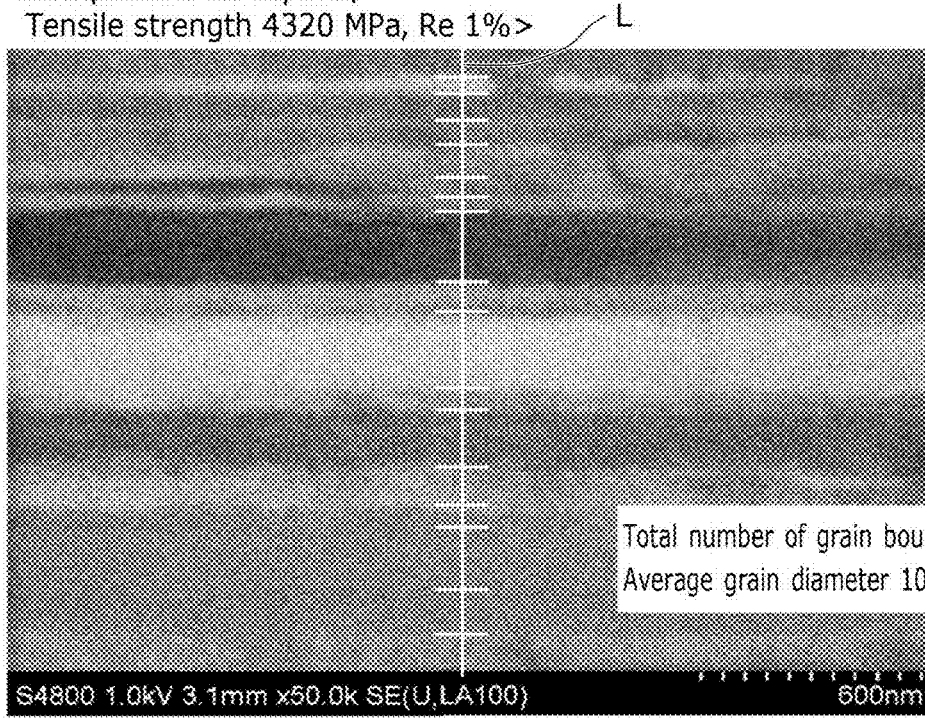
FIG. 2A is a diagram illustrating an enlarged view of a surface of a tungsten wire having a tensile strength of 4320 MPa according to Comparison Example 1.
Figure 2B:
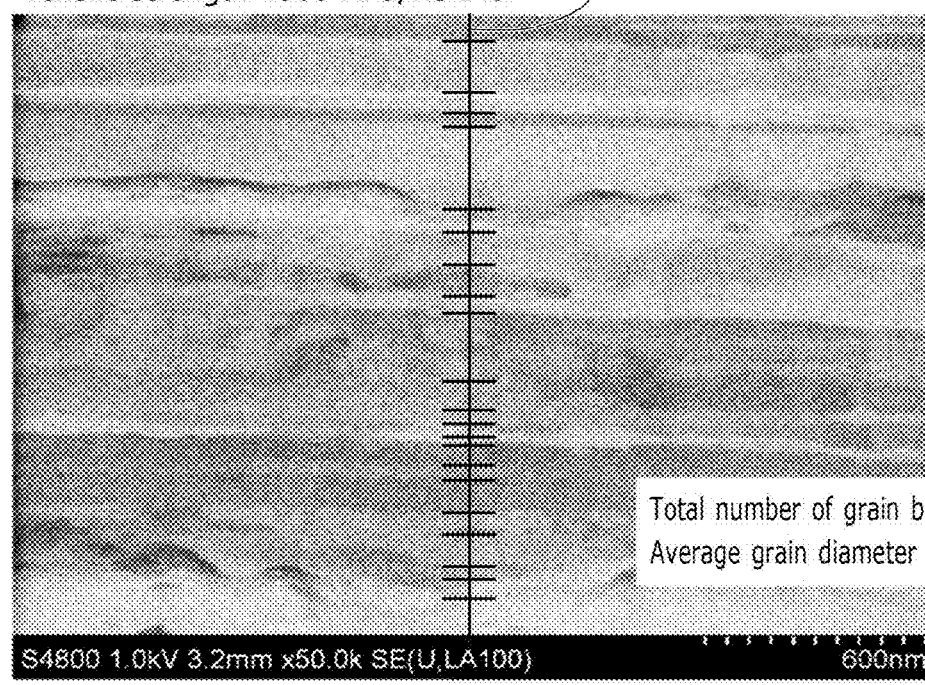
FIG. 2B is a diagram illustrating an enlarged view of a surface of a tungsten wire having a tensile strength of 4800 MPa according to Working Example 1.
Figure 2C:
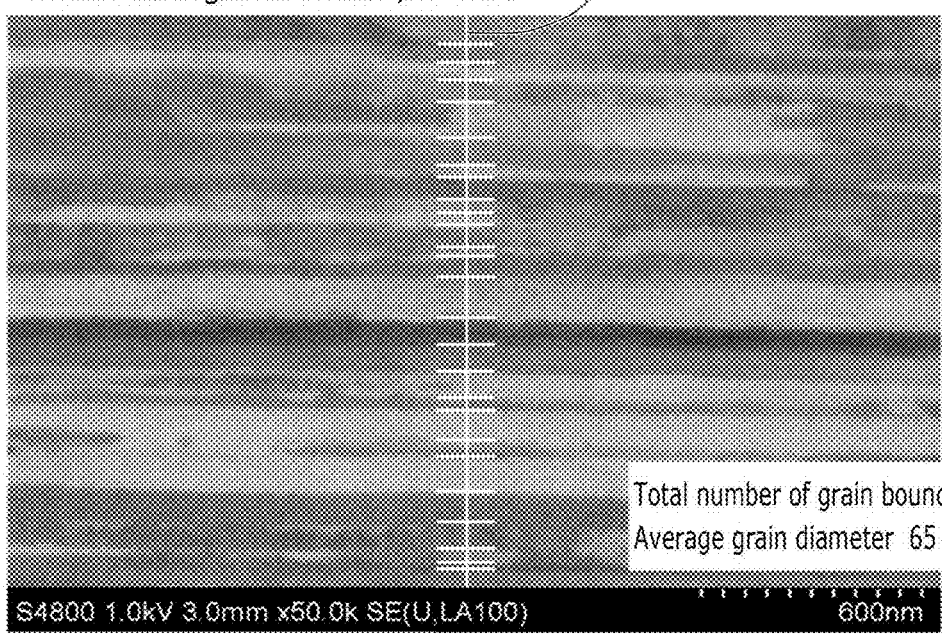
FIG. 2C is a diagram illustrating an enlarged view of a surface of a tungsten wire having a tensile strength of 5040 MPa according to Working Example 2.
Figure 2D:
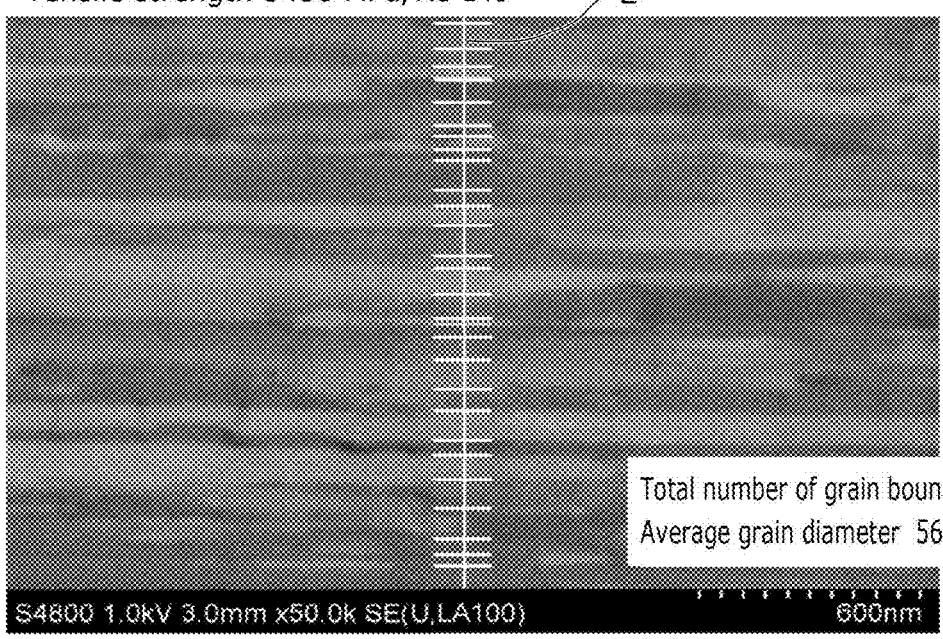
FIG. 2D is a diagram illustrating an enlarged view of a surface of a tungsten wire having a tensile strength of 5430 MPa according to Working Example 3.
Figure 2E:
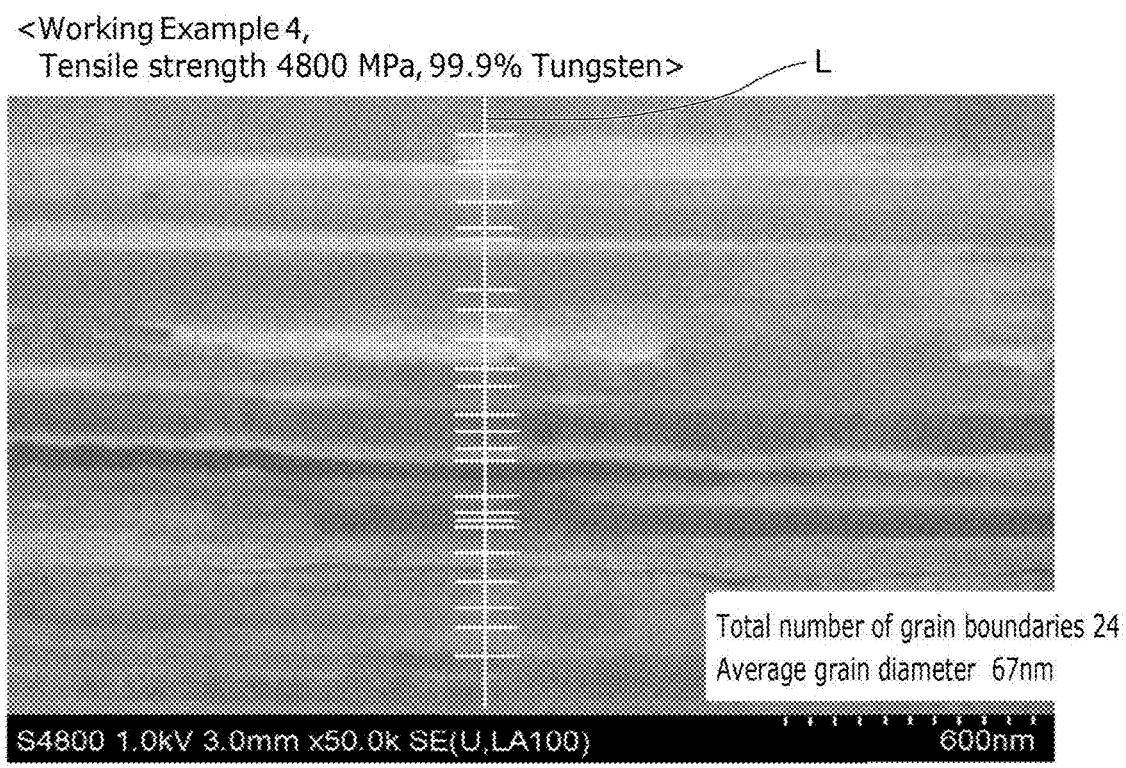
FIG. 2E is a diagram illustrating an enlarged view of a surface of a tungsten wire (with the degree of purity of 4800 MPa) having a tensile strength of 4800 MPa according to Working Example 4.

The following describes in detail a tungsten wire according to an embodiment of the present invention, with reference to the drawings. It should be noted that the embodiment described below indicates one specific example of the present invention. The numerical values, shapes, materials, structural components, the disposition and connection of the structural components, etc. described in the following embodiment are mere examples, and do not intend to limit the present invention. Furthermore, among the structural components in the following embodiment, components not recited in the independent claims each of which indicates the broadest concept of the present invention are described as arbitrary structural components.

In addition, each diagram is a schematic diagram and not necessarily strictly illustrated. Thus, the scales of the drawings, for example, are not necessarily precise. In the drawings, essentially the same structural components share the same reference signs, and redundant descriptions will be omitted or simplified.

In addition, a term, such as "perpendicular" or "identical", representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as few percentages, is connoted in the term or range.

Embodiment

Tungsten Wire

First, a configuration of a tungsten wire according to the present embodiment will be described.

FIG. 1 is a perspective view schematically illustrating tungsten wire 10 according to the present embodiment. FIG. 1 illustrates an example in which tungsten wire 10 is wound around a winding core material. In addition, FIG. 1 schematically illustrates a partially enlarged view of tungsten wire 10.

Tungsten wire 10 according to the present embodiment contains tungsten (W) or a tungsten alloy. A tungsten content of tungsten wire 10 is, for example, at least 90 wt %. The tungsten content may be at least 95 wt %, at least 99 wt %, or at least 99.9 wt %. It should be noted that the tungsten content is the ratio of a weight of tungsten to a total weight of tungsten wire 10. The same holds true for the content of other metal elements, etc. such as rhenium (Re) and potassium (K) which will be described later.

The tungsten alloy is, for example, an alloy containing rhenium and tungsten, namely, a ReW alloy. It is possible to enhance the strength of tungsten wire 10 as the rhenium content increases. However, an excessively high rhenium content degrades the workability of tungsten wire 10, making it difficult to render tungsten wire 10 thinner.

According to the present embodiment, the rhenium content of tungsten wire 10 is at least 0.1 wt % and at most 10 wt %. For example, the rhenium content may be at least 0.5 wt % and at most 5 wt %. One example of the rhenium content is 1 wt %, but the rhenium content may be 3 wt %. It should be noted that the rhenium content may be higher than 10 wt %.

Tungsten wire 10 has a diameter less than or equal to 100 μm. For example, the diameter of tungsten wire 10 may be 60 μm or less, or may be 40 μm or less. The diameter of tungsten wire 10 may be 30 μm or less, or may be 20 μm or less. The diameter of tungsten wire 10 may be 10 μm, for example.

According to the present embodiment, the diameter of tungsten wire 10 is constant. However, the diameter of tungsten wire 10 need not necessarily be completely constant, and may differ at different portions along the axis by a certain percentage such as 1%. As illustrated in FIG. 1, tungsten wire 10 has, for example, a circular cross-section shape in the cross section orthogonal to axis P. The cross-section shape of tungsten wire 10 may be a square, a rectangle, an oval, or the like.

Tungsten wire 10 containing tungsten or a tungsten alloy has a tensile strength of at least 4800 MPa. The tensile strength of tungsten wire 10 may be at least 5000 MPa, or may be at least 5300 MPa. The tensile strength of tungsten wire 10 can be set to a desired value, by appropriately adjusting (i) a diameter, (ii) at least one of an average width of surface crystal grains or an average crystal grain size, and (iii) a tungsten content. For example, it is possible to implement tungsten wire 10 having a tensile strength of approximately 5500 MPa.

In addition, an elastic modulus of tungsten wire 10 is at least 350 GPa and at most 450 GPa. Here, the elastic modulus is a longitudinal elastic modulus. An elastic modulus of piano wire is generally in a range of from 150 GPa to 250 GPa. In other words, tungsten wire 10 has an elastic modulus approximately twice as high as that of piano wire.

As having an elastic modulus higher than or equal to 350 GPa, tungsten wire 10 is resistant to deformation. Stated differently, tungsten wire 10 is less likely to elongate. Meanwhile, as having an elastic modulus lower than or equal to 450 GPa, it is possible to transform tungsten wire 10 when force of a certain strength is applied. Specifically, since tungsten wire 10 can be bent, when tungsten wire 10 is used as a saw wire, for example, it is possible to easily loop the saw wire over a guide roller or the like.

Tungsten wire 10 according to the present embodiment has at least one of three characteristics related to crystallinity. The following describes in detail the characteristics of crystallinity.

Width of Surface Crystal Grain

First, a width of a surface crystal grain of tungsten wire 10 will be described.

A surface crystal grain is a crystal grain of tungsten or a tungsten alloy on surface 20 of tungsten wire 10. In tungsten wire 10, the width of a surface crystal grain in a direction perpendicular to axis P is less than or equal to 76 nm. The width of a surface crystal grain in the direction perpendicular to axis P refers to a length along the direction perpendicular to axis P.

The following describes a relationship between a tensile strength and a width of a surface crystal grain of samples of a plurality of tungsten wires manufactured by the inventors.

FIG. 2A to FIG. 2E are diagrams respectively illustrating the enlarged views of the surface of tungsten wire according to Comparison Example 1 and Working Examples 1 to 4. The tungsten wires according to Comparison Example 1 and Working Examples 1 to 3 each contain a rhenium tungsten alloy including 1 wt % rhenium. The tungsten wire according to Comparison Example 4 contains 99.9 wt % tungsten.

The tensile strength of the tungsten wire according to Comparison Example 1 is 4320 MPa. The tensile strengths of the tungsten wires according to Working Examples 1, 2, and 3 are 4800 MPa, 5040 MPa, and 5430 MPa, respectively. The tensile strength of the tungsten wire according to Working Example 4 is 4800 MPa. It should be noted that, in each of Comparison Example 1 and Working Examples 1 to 4, the diameter of the tungsten wire is 50 μm.

The tungsten wires according to Working Examples 1 to 4 are samples of the tungsten wires manufactured using a manufacturing method which will be described later. Meanwhile, the tungsten wire according to Comparison Example 1 is a sample which is rendered thinner to a diameter of 50 μm by heat drawing (Step S16 in FIG. 7) without performing drawing at room temperature (Step S20 in FIG. 7) in the manufacturing method which will be described later. The same holds true for Comparison Examples 2 and 3 which will be described later.

FIG. 2A to FIG. 2E each illustrate a partially enlarged view of surface 20 of tungsten wire 10 illustrated in FIG. 1. Each of the diagrams illustrates a scanning electron microscope (SEM) image of surface 20 of the sample of tungsten wire 10. In each of the diagrams, a region of a uniform density (color) represents a single crystal grain. The lateral direction in the figure of each of the drawings is a direction parallel to axis P, and the surface crystal grain elongatedly extends in a direction along axis P.

In each of the diagrams, solid line L at the center is a straight line extending in a direction perpendicular to axis P. The average width of the surface crystal grains is calculated by counting a total number of boundaries between crystal grains (i.e., grain boundaries) along solid line L within the range indicated in each of the diagrams. More specifically, the average width of the surface crystal grains is calculated by dividing the length of a counting range, i.e., the vertical length of each of the diagrams, by the number resulting from adding 1 to the total number of grain boundaries. It should be noted that, in each of the diagrams, a plurality of short lines perpendicular to solid line L each indicate a grain boundary.

Table 1 shows the relationship between a tensile strength and an average width of the surface crystal grains calculated based on the result of counting the total number of grain boundaries.

TABLE 1

| | Tensile strength [MPa] | Number of grain boundaries | Average width of surface crystal grains [nm] |
| --- | --- | --- | --- |
| Comparison Example 1 | 4320 | 16 | 100 |
| Working Example 1 | 4800 | 21 | 76 |
| Working Example 2 | 5040 | 25 | 65 |
| Working Example 3 | 5430 | 28 | 56 |
| Working Example 4 | 4800 | 24 | 67 |

Figure 3:
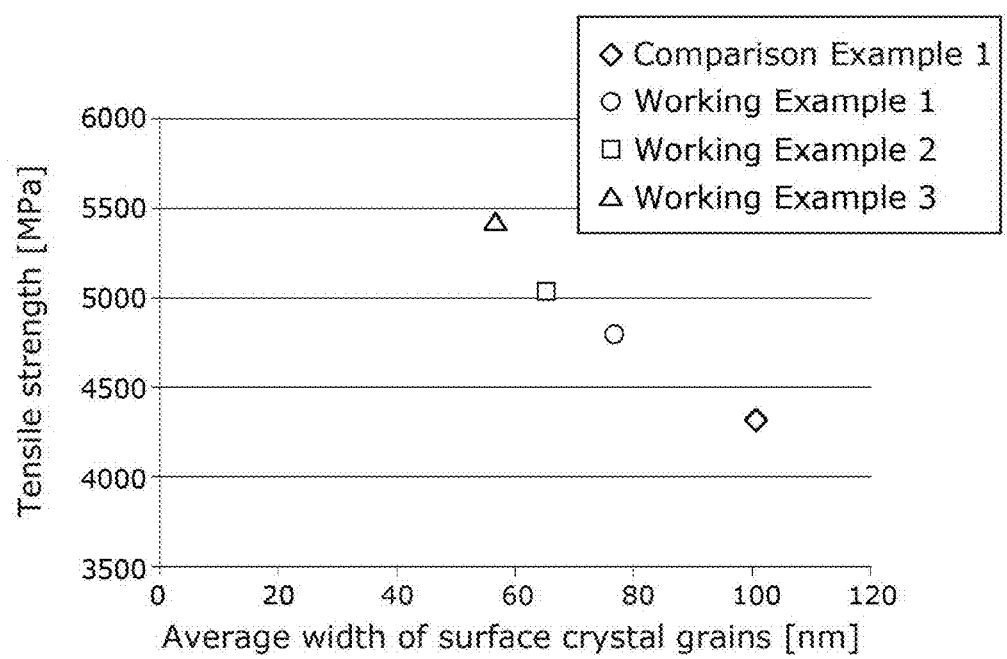
FIG. 3 is a diagram illustrating a relationship between a tensile strength and an average width of surface crystal grains of a tungsten wire.

FIG. 3 is a diagram illustrating a relationship between a tensile strength and an average width of surface crystal grains of tungsten wire 10 according to the present embodiment. In FIG. 3, the horizontal axis represents an average width [nm] of surface crystal grains, and the vertical axis represents a tensile strength [MPa].

As illustrated in Table 1 and FIG. 3, there is a negative correlation between an average width of surface crystal grains and a tensile strength. In other words, as the average width of surface crystal grain decreases, the tensile strength increases. In tungsten wire 10 according to the present embodiment, the average width of surface crystal grains is less than or equal to 76 nm. With this, a tungsten wire having a high tensile strength of at least 4800 MPa is implemented. In addition, for example, by setting an average width of surface crystal grains to at most 56 nm, it is possible to implement a tungsten wire having a high tensile strength of at least 5430 MPa.

When Working Example 4 in which the tungsten wire has a high content of tungsten and Working Example 1 in which the tungsten wire contains a rhenium tungsten alloy are compared, the average width of surface crystal grains of Working Example 1 is greater than the average width of surface crystal grains of Working Example 4, for implementing the same tensile strength. This is because a crystal grain of a rhenium tungsten alloy has a higher strength than a crystal grain of pure tungsten. In other words, by increasing the rhenium content, it is possible to increase the tensile strength to be higher than 4800 MPa even when the width of a surface crystal grain is greater than 76 nm. Accordingly, the average width of surface crystal grains need not necessarily be less than or equal to 76 nm. For example, as the rhenium content increases, the width of a surface crystal grain of tungsten wire 10 having a tensile strength of 4800 MPa increases.

As described above, tungsten wire 10 according to the present embodiment is a tungsten wire containing tungsten or a tungsten alloy, and an average width of surface crystal grains in the direction perpendicular to axis P of tungsten wire 10 is at most 76 nm.

According to this configuration, it is possible to implement tungsten wire 10 having a high tensile strength.

In addition, for example, a tungsten content of tungsten wire 10 is at least 90 wt %.

According to this configuration, even in the case where tungsten wire 10 contains a tungsten alloy, it is possible to set the rhenium content to be less than 10 wt %, for example. As a result, it is possible to enhance the workability of tungsten wire 10.

Average Crystal Grain Size

Next, the average crystal grain size of tungsten wire 10 will be described.

An average crystal grain size is a numerical value calculated based on the number of crystals per unit area in cross section 30 of tungsten wire 10. With a decrease in value of the average crystal grain size, the size of each crystal is reduced; that is, the number of crystals increases.

The average crystal grain size is calculated by averaging crystal grain sizes in a plurality of target ranges. The crystal grain size can be measured, for example, by the planimetric method, targeting a range having an area of 600 nm×600 nm in cross section 30. More specifically, the crystal grain size is calculated using Expression (1) below.

$$\text{Crystal grain size} = (\text{target area}/\text{the number of crystals})^{(1/2)} \quad (1)$$

It should be noted that, in Expression (1), "X^(½)" represents a square root of X.

According to the present embodiment, the average crystal grain size of tungsten wire 10 in cross section 30 is at most 0.16 μm. In addition, according to the present embodiment, in cross section 30 that is perpendicular to axis P of tungsten wire 10 as illustrated in FIG. 1, the average crystal grain size in center portion 31 and the average crystal grain size in periphery portion 32 are different from each other. More specifically, the average crystal grain size in periphery portion 32 is smaller than the average crystal grain size in center portion 31 by at least 5%.

For example, center portion 31 is a predetermined range through which axis P passes. In the example illustrated in FIG. 1, axis P passes through the center of center portion 31. Periphery portion 32 is a portion located outward center portion 31. For example, periphery portion 32 is located, in cross section 30 of tungsten wire 10, closer to surface 20 than the midpoint of the radius connecting axis P (i.e., the center) and a point on surface 20 is.

Hereinafter, a relationship between a tensile strength and the average crystal grain size of samples of a plurality of tungsten wires manufactured by the inventors will be described.

The tensile strengths of the tungsten wires according to Comparison Example 1 and Working Examples 1, 2, and 3 described below are 4320 MPa, 4800 MPa, 5040 MPa, and 5430 MPa, respectively, which are equivalent to the case illustrated in FIG. 2A to FIG. 2D. In addition, as Comparison Examples 2 and 3, the average crystal grain sizes are calculated also for tungsten wires respectively having tensile strengths 3800 MPa and 4000 MPa.

Figure 4A:
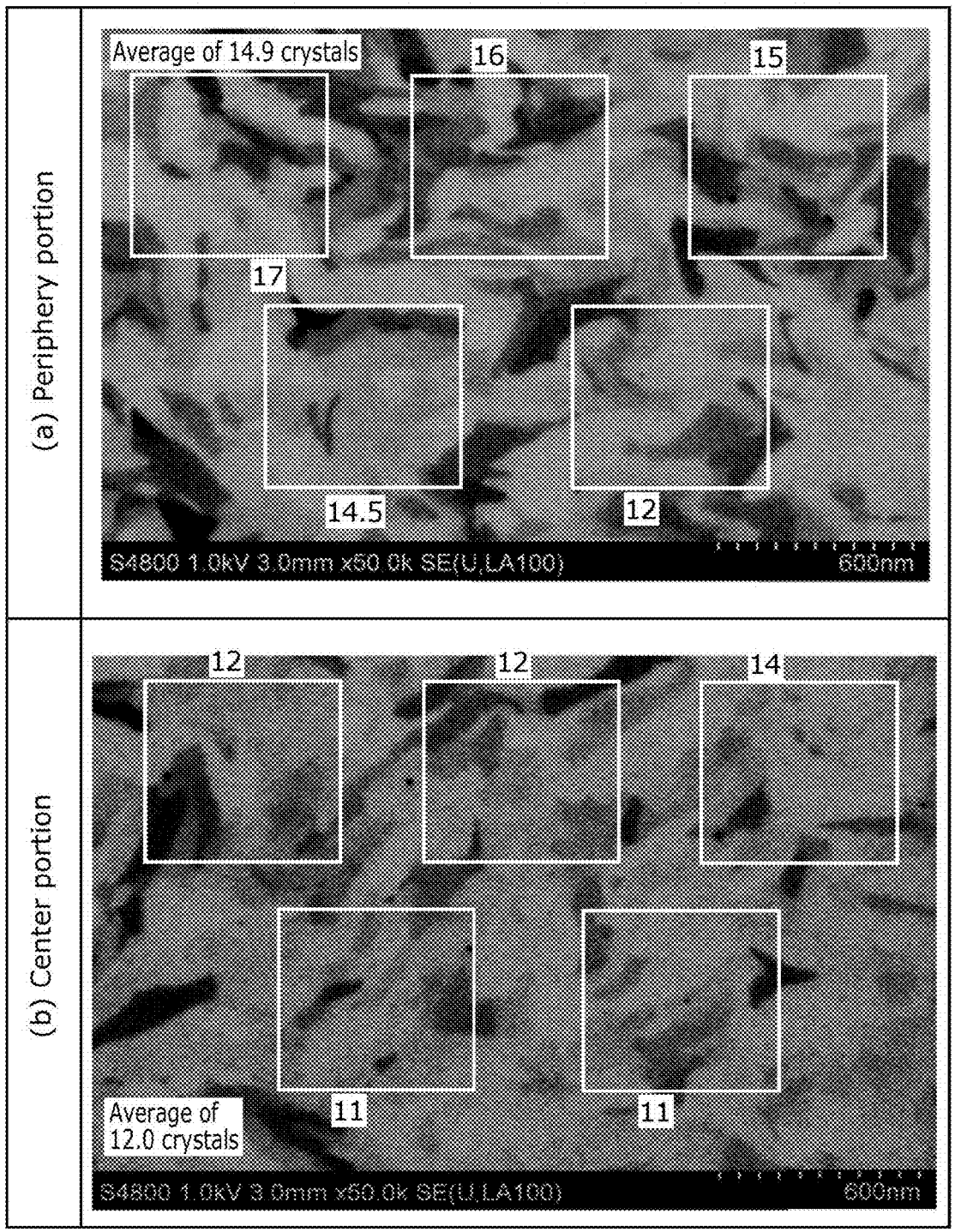
FIG. 4A is a diagram illustrating an enlarged view of a cross section of the tungsten wire having a tensile strength of 4800 MPa according to Working Example 1.
Figure 4B:
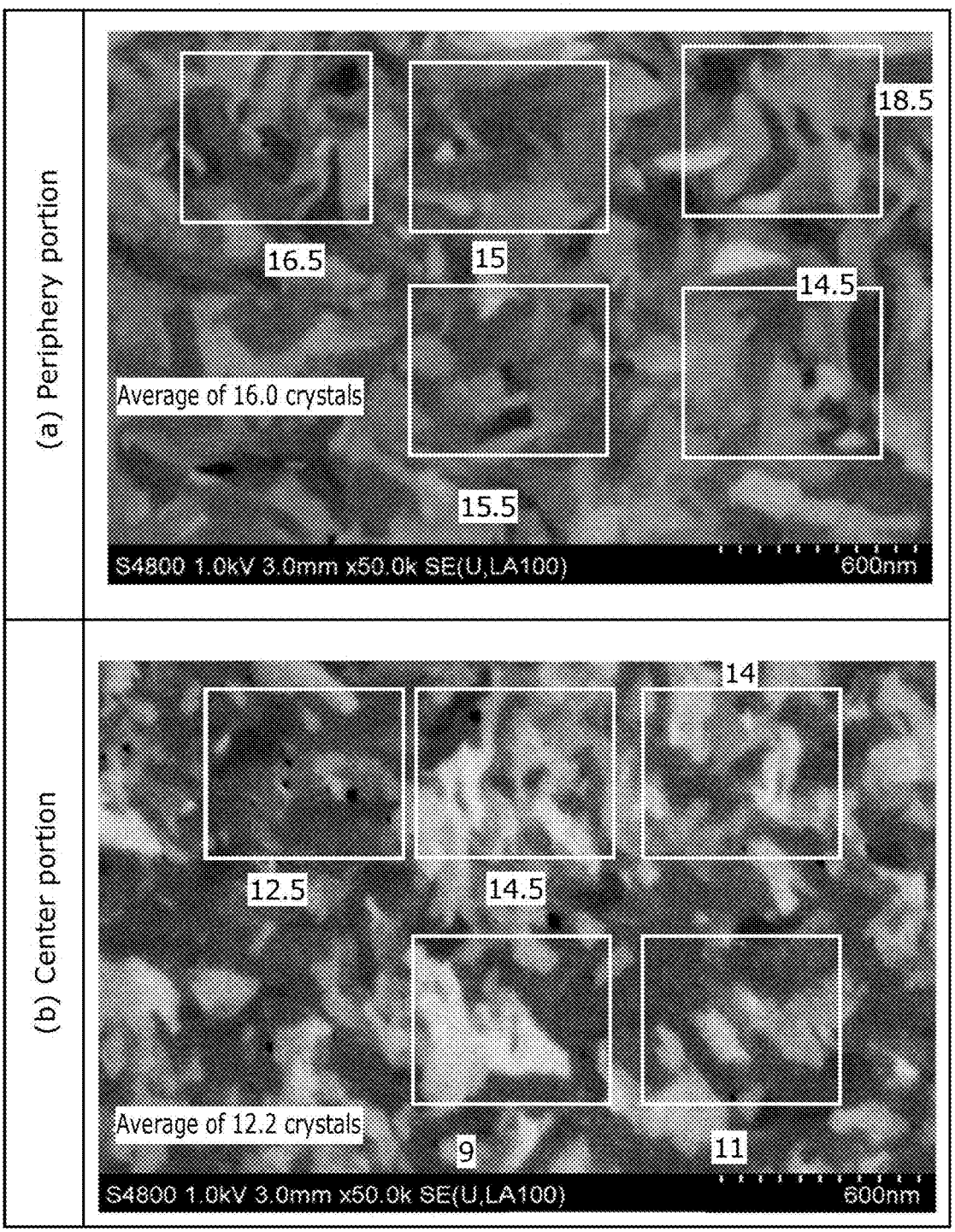
FIG. 4B is a diagram illustrating an enlarged view of a cross section of the tungsten wire having a tensile strength of 5040 MPa according to Working Example 2.
Figure 4C:
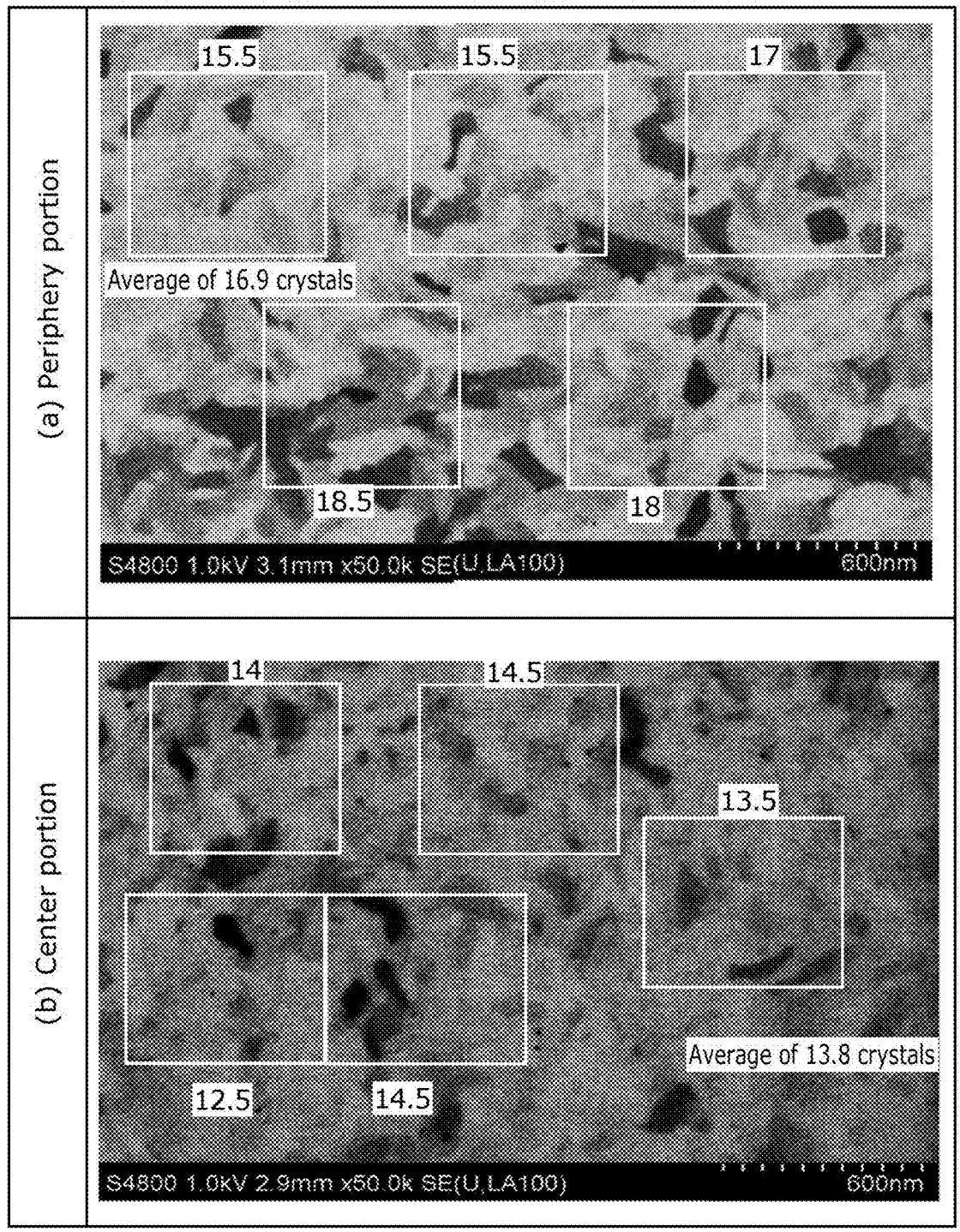
FIG. 4C is a diagram illustrating an enlarged view of a cross section of the tungsten wire having a tensile strength of 5430 MPa according to Working Example 3.

FIG. 4A to FIG. 4C are diagrams respectively illustrating enlarged views of cross section 30 of tungsten wire 10 according to Working Examples 1 to 3. In each of the diagrams, (a) illustrates an SEM image of periphery portion 32 of cross section 30 of a sample of tungsten wire 10, and (b) illustrates an SEM image of center portion 31. Each of the diagrams also illustrates, in each of (a) and (b), five target areas each of which is a square of 600 nm×600 nm and is denoted by a solid line, and the result of counting the number of crystals included in each of the target areas is indicated adjacent to the corresponding one of the target areas. It should be noted that, when counting the number of crystals, a crystal that is completely within the target area is counted as one crystal, and a crystal that is at least partially outside the target area is counted as a half of a crystal.

The average crystal grain size of each of center portion 31 and periphery portion 32 is obtained by averaging the crystal grain size calculated in each of the five target areas. The average crystal grain size of cross section 30 as a whole is obtained by averaging, for example, the crystal grain sizes of a total of 10 target areas including the target areas of center portion 31 and periphery portion 32.

First, Table 2 shows a relationship between a tensile strength and an average crystal grain size of cross section 30 as a whole.

TABLE 2

|  | Tensile strength [MPa] | Average crystal grain size [μm] |
|---|---|---|
| Comparison Example 1 | 3800 | 0.247 |
| Comparison Example 2 | 4000 | 0.203 |
| Comparison Example 3 | 4320 | 0.178 |
| Working Example 1 | 4800 | 0.155 |
| Working Example 2 | 5040 | 0.150 |
| Working Example 3 | 5430 | 0.146 |

Figure 5:
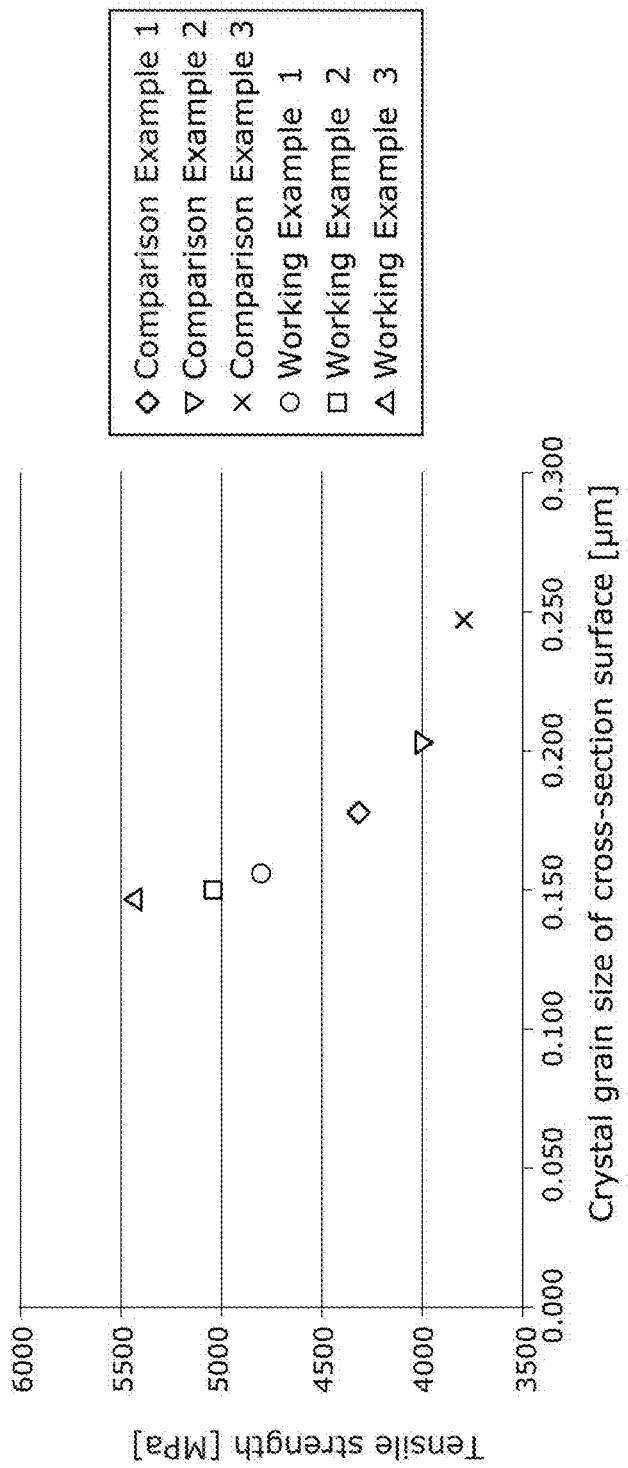
FIG. 5 is a diagram illustrating a relationship between a tensile strength and an average crystal grain size in the cross section of a tungsten wire.

FIG. 5 is a diagram illustrating a relationship between a tensile strength and an average crystal grain size of cross section 30 of tungsten wire 10 according to the present embodiment. In FIG. 5, the horizontal axis represents an average crystal grain size [μm] in cross section 30, and the vertical axis represents a tensile strength [MPa].

As indicated by Table 2 and FIG. 5, the tensile strength increases with a decrease in an average crystal grain size. In particular, the tensile strength increases significantly when the average crystal grain size falls below 0.20 μm, and the tensile strength increases even more significantly when the average crystal grain size becomes or falls below 0.16 μm. In tungsten wire 10 according to the present embodiment, the average crystal grain size in cross section 30 is at most 0.160 μm. With this, a tungsten wire having a high tensile strength of at least 4800 MPa is implemented. In addition, for example, by setting an average width of surface crystal grains to at most 0.146 μm, it is possible to implement a tungsten wire having a high tensile strength of at least 5430 MPa.

Next, a relationship between a tensile strength and an average crystal grain size of each of center portion 31 and periphery portion 32 is indicated in Table 3.

TABLE 3

|  | Tensile strength [MPa] | Average crystal grain size of periphery portion [μm] | Average crystal grain size of center portion [μm] | Periphery portion/Center portion [%] |
|---|---|---|---|---|
| Working Example 1 | 4800 | 0.155 | 0.173 | 90 |
| Working Example 2 | 5040 | 0.150 | 0.172 | 87 |
| Working Example 3 | 5430 | 0.146 | 0.162 | 90 |

As illustrated in Table 3, in tungsten wire 10 according to Working Examples 1 to 3, the average crystal grain size of periphery portion 32 is smaller than the average crystal grain size of center portion 31 by at least 5%. For example, in tungsten wire 10 according to Working Examples 1 to 3, the average crystal grain size of periphery portion 32 is smaller than the average crystal grain size of center portion 31 by at least 10%. In Comparison Examples 1 to 3, such a difference of at least 5% was not observed. For example, in Comparison Example 3, the average crystal grain size of periphery portion 32 was 0.178 μm, and the average crystal grain size of center portion 31 was 0.173 μm. This means that, in Comparison Example 3, the average crystal grain size of periphery portion 32 is merely approximately 3% smaller than the average crystal grain size of center portion 31.

As described above, tungsten wire 10 according to the present embodiment is a tungsten wire containing tungsten or a tungsten alloy, and has an average crystal grain size of at most 0.16 μm in the cross section perpendicular to axis P of tungsten wire 10. The average crystal grain size of periphery portion 32 outside center portion 31 in cross section 30 is smaller than the average crystal grain size of center portion 31 in cross section 30 by at least 5%.

As described above, in tungsten wire 10 according to the present embodiment, the crystal grain of tungsten is smaller in periphery portion 32 than in center portion 31 of cross section 30. The smaller crystal grains of tungsten wire 10 can increase the tensile strength of tungsten wire 10. In other words, it is possible to implement tungsten wire 10 having a high tensile strength.

Secondary Recrystallization Temperature

Next, a secondary recrystallization temperature of tungsten wire 10 will be described.

Tungsten wire 10 according to the present embodiment includes small primary recrystallization grains, as a result of being manufactured by the manufacturing method which will be described later. When tungsten wire 10 is heated at a high temperature, the primary recrystallization grains are recrystallized again. As a result, large-sized secondary recrystallization grains are formed. The temperature at the time when the secondary recrystallization grains are formed is the secondary recrystallization temperature. The secondary recrystallization temperature of tungsten wire 10 according to the present embodiment is at least 2200 degrees Celsius.

The following describes a relationship between a tensile strength and a secondary recrystallization temperature of samples of a plurality of tungsten wires manufactured by the inventors.

Figure 6:
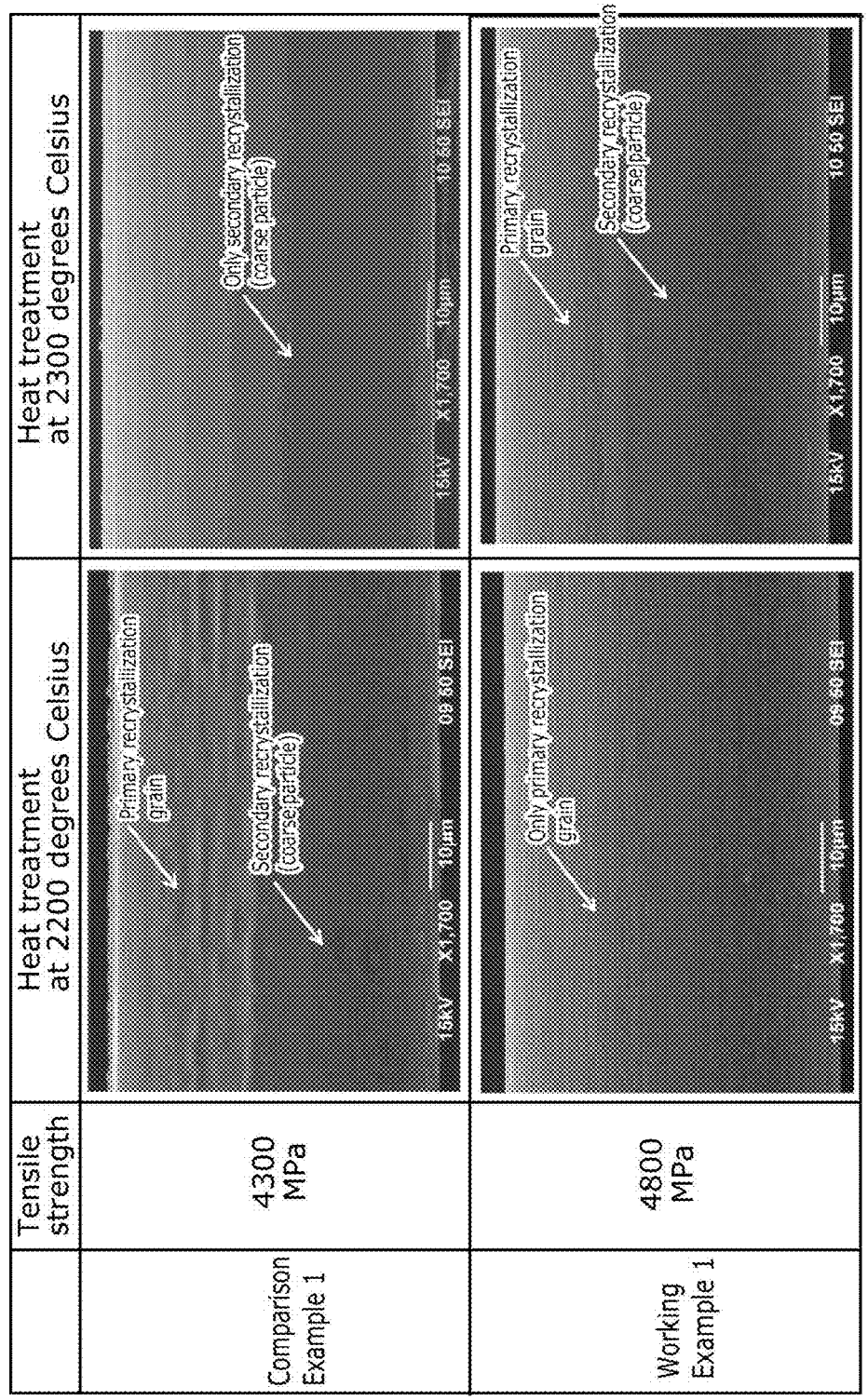
FIG. 6 is a diagram illustrating a relationship between a tensile strength and a secondary recrystallization temperature of a tungsten wire.

FIG. 6 is a diagram illustrating a relationship between a tensile strength and a secondary recrystallization temperature of a tungsten wire. FIG. 6 illustrates an SEM image of surface 20 of the tungsten wire of each of Comparison Example 1 and Working Example 1, after the tungsten wire was subjected to heat treatment. The temperatures at the time of heat treatment were 2200 degrees Celsius and 2300 degrees Celsius. Here, the heat treatment was carried out while conducting electricity through the tungsten wire.

As illustrated in FIG. 6, in Comparison Example 1, it is confirmed that a secondary recrystallization grain larger in size than a primary recrystallization grain has been generated in a portion of tungsten wire 10 as a result of the heat treatment at 2200 degrees Celsius. When the heat treatment was carried out at 2300 degrees Celsius, the secondary recrystallization grains are generated in almost the entire portion of tungsten wire 10.

Meanwhile, in Working Example 1, it is confirmed that the secondary recrystallization of tungsten wire 10 did not occur by the heat treatment at 2200 degrees Celsius, and that the primary recrystallization grains were generated in almost the entire portion of tungsten wire 10. When the heat treatment was carried out at 2300 degrees Celsius, it is confirmed that the secondary recrystallization grains were generated in a portion of tungsten wire 10.

As described above, tungsten wire 10 according to the present embodiment is a tungsten wire containing tungsten or a tungsten alloy, and the secondary recrystallization temperature of the tungsten wire is at least 2200 degrees Celsius. In addition, for example, the secondary recrystallization temperature of tungsten wire 10 may be less than 2300 degrees Celsius.

According to this configuration, it is possible to implement tungsten wire 10 having a high tensile strength. In addition, the tensile strength decreases when a secondary recrystallization grain is generated. Since the secondary recrystallization temperature of tungsten wire 10 is at least 2200 degrees Celsius, tungsten wire 10 can maintain a high tensile strength even under a high-temperature environment of at least 2200 degrees Celsius and at most the secondary recrystallization temperature. Accordingly, tungsten wire 10 is expected to be used under various high-temperature environments.

Manufacturing Method of Tungsten Wire

Figure 7:
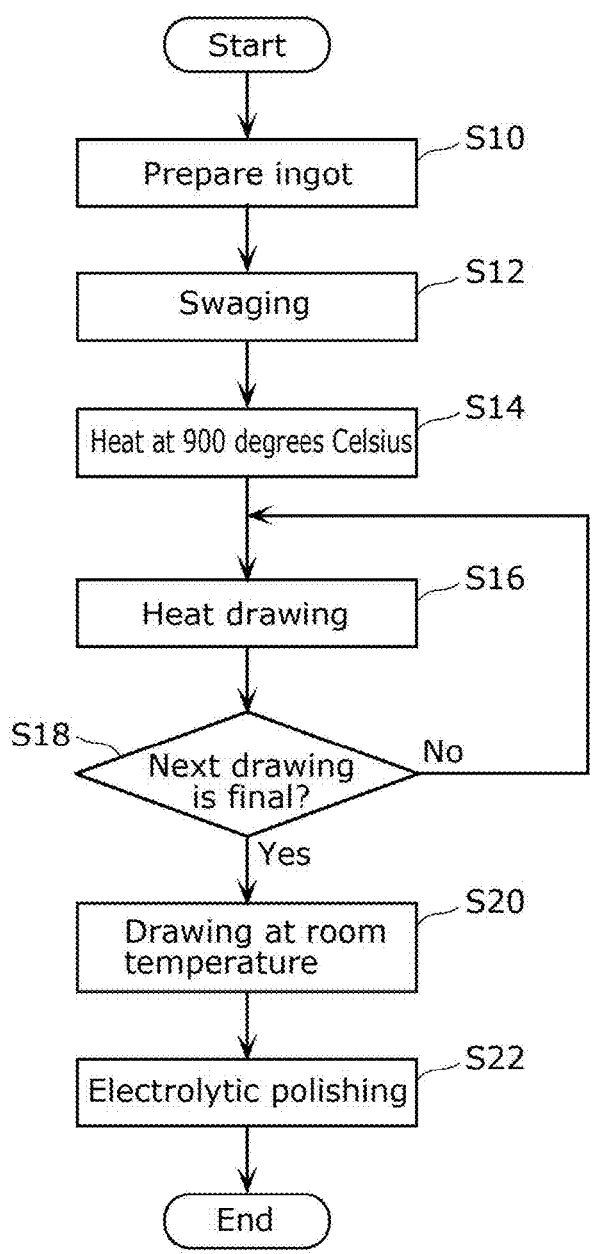
FIG. 7 is a flowchart illustrating a manufacturing method of the tungsten wire according to the embodiment.

Next, a manufacturing method of tungsten wire 10 according to the present embodiment will be described with reference to FIG. 7. FIG. 7 is a flowchart illustrating a manufacturing method of tungsten wire 10 according to the present embodiment.

As illustrated in FIG. 7, first, a tungsten ingot is prepared (S10). More specifically, a tungsten ingot is produced by preparing an aggregation of tungsten powders and pressing and sintering the aggregation of tungsten powders.

It should be noted that, when tungsten wire 10 containing a tungsten alloy is manufactured, a mixture resulting from mixing tungsten powders and metal powders (rhenium powders, for example) at a predetermined proportion is prepared instead of the aggregation of tungsten powders. An average grain diameter of a tungsten powder and a rhenium powder is in a range of from at least 3 μm to at most 4 μm, for example, but not limited to this example.

Next, swaging processing is applied to the manufactured tungsten ingot (S12). More specifically, the tungsten ingot is press-forged from its periphery and extended to be a tungsten wire having a wire shape. Instead of the swaging processing, the tungsten ingot may be subjected to rolling processing. For example, a tungsten ingot having a diameter of approximately 15 mm is shaped into a tungsten wire having a diameter of approximately 3 mm, by repeatedly applying the swaging processing to the tungsten ingot. Annealing is performed during the swaging processing to ensure workability in the subsequent processes. For example, annealing at 2400 degrees Celsius is performed in a diameter range of from at least 8 mm to at most 10 mm. However, in order to ensure a tensile strength by crystal grain refinement, annealing is not performed in the swaging processing with a diameter less than 8 mm.

Next, prior to heat drawing, the tungsten wire is heated at 900 degrees Celsius (S14).

More specifically, the tungsten wire is heated directly by a burner or the like. An oxide layer is formed on the surface of the tungsten wire by heating the tungsten wire, to prevent wire breakage during the processing in the subsequent heat drawing.

Next, heat drawing is carried out (S16). More specifically, drawing of the tungsten wire, namely, a wire drawing process (thinning) of the tungsten wire, is performed using a single wire drawing die, while heating is performed. A heating temperature is, for example, 1000 degrees Celsius. The workability of a tungsten wire is enhanced as the heating temperature increases, and thus it is possible to easily perform drawing. The reduction in area of the tungsten wire by one drawing using a single wire drawing die is, for example, at least 10% and at most 40%. In the drawing processing, a lubricant including graphite dispersed in water may be used.

After the drawing processing, electrolytic polishing may be performed to smooth the surface of the tungsten wire. The electrolytic polishing is carried out, for example, as a result of generation of a potential difference between a tungsten wire and a counter electrode in a state in which the tungsten wire and counter electrode are bathed into electrolyte, e.g., aqueous sodium hydroxide.

The heat drawing (S16) is repeatedly performed before a tungsten wire having a desired diameter is obtained (No in S18). Here, the desired diameter is a diameter at the stage immediately before performing the final drawing processing (S20), and is at most 250 μm, for example.

In the repeating of heat drawing, a wire drawing die having a smaller pore diameter than a pore diameter of a wire drawing die used in the immediately-before drawing is used. In addition, in the repeating of heat drawing, the tungsten wire is heated at a heating temperature lower than a heating temperature of the immediately-before drawing. For example, the heating temperature in drawing processing immediately before the final drawing processing is lower than any previous heating temperatures, and is, for example, 400 degrees Celsius, which contributes to refinement of crystal grains. It should be noted that the heating temperature in heat drawing is adjusted such that the amount of oxide attached to the surface of the tungsten wire falls within a range of from at least 0.8 wt % to at most 1.6 wt % of the tungsten wire, for example. In the repeating of heat drawing, electrolytic polishing may be omitted.

When a tungsten wire having a desired diameter is obtained, and the next drawing processing is the final drawing processing (Yes in S18), drawing at room temperature is carried out (S20). More specifically, a tungsten wire is drawn without heating, thereby achieving further refinement of crystal grains. In addition, the drawing at room temperature yields an advantageous effect of aligning crystal orientations in a processing axis direction (specifically, a direction parallel to axis P). The room temperature is, for example, a temperature in a range of from at least 0 degrees Celsius to at most 50 degrees Celsius, and is 30 degrees Celsius as one example. More specifically, the tungsten wire is drawn using a plurality of wire drawing dies having different pore diameters. In the drawing at room temperature, a liquid lubricant such as a water-soluble lubricant is used. Since heating is not carried out in the drawing at room temperature, liquid evaporation is inhibited. Accordingly, a sufficient function as a lubricant can be exerted. In contrast to the heat drawing at 600 degrees Celsius or higher which is the traditional tungsten wire processing method conventionally performed, the tungsten wire is not heated and is processed while being cooled with the liquid lubricant. As a result, it is possible to inhibit dynamic recovery and dynamic recrystallization, contribute to the refinement of crystal grains without wire breakage, and achieve a high tensile strength.

Lastly, electrolytic polishing is performed on the tungsten wire having a desired diameter resulting from the drawing at room temperature (S22). The electrolytic polishing is carried out, for example, as a result of generation of a potential difference between a tungsten wire and a counter electrode in a state in which the tungsten wire and counter electrode are bathed into electrolyte, e.g., aqueous sodium hydroxide.

Through the above-described processes, tungsten wire 10 according to the present embodiment is manufactured. Through the above-described manufacturing processes, tungsten wire 10 immediately after manufacturing has a length of, for example, at least 50 km, and thus is industrially available. Tungsten wire 10 is cut to a suitable length according to the aspect in which tungsten wire 10 is to be used, and can also be used in a shape of a needle or a stick. As described above, according to the present embodiment, it is possible to industrially mass-produce tungsten wire 10 to be used in various areas such as medical needles, saw wires, screen printing meshes, etc.

Tungsten wires 10 according to Working Examples 1 to 4 are tungsten wires manufactured through the above-described processes. The differences in the tensile strength between Working Examples 1 to 3 can be implemented, for example, by decreasing an annealing temperature of annealing performed during the swaging processing on a tungsten stick having a diameter in a range of from at least 8 mm to at most 10 mm. For example, the tensile strength can be improved by 3% as a result of decreasing the annealing temperature by 200 degrees Celsius with respect to a normal annealing temperature. In the same manner as above, the tensile strength can be improved by 5% as a result of decreasing the annealing temperature by 400 degrees Celsius. In addition, the tensile strength can be further improved by starting the drawing at room temperature (S20) with a larger diameter. The above-described methods and the combination of these methods make it possible to manufacture a tungsten wire having a higher tensile strength (for example, Working Example 3).

Each of the processes indicated in the manufacturing method of tungsten wire 10 is carried out, for example, as an in-line process. More specifically, the plurality of wire drawing dies used in Step S16 are arranged in descending order of pore diameters in a production line. A heating device such as a burner is disposed between the respective wire drawing dies. In addition, an electrolytic polishing device may be disposed between the respective wire drawing dies. The plurality of wire drawing dies used in Step S20 are arranged in descending order of pore diameters on the downstream side (i.e., the subsequent-process side) of the wire drawing dies used in Step S16, and the electrolytic polishing device is disposed on the downstream side of the wire drawing die having the smallest pore diameter. It should be noted that each of the processes may be individually performed.

Saw Wire

Figure 8:
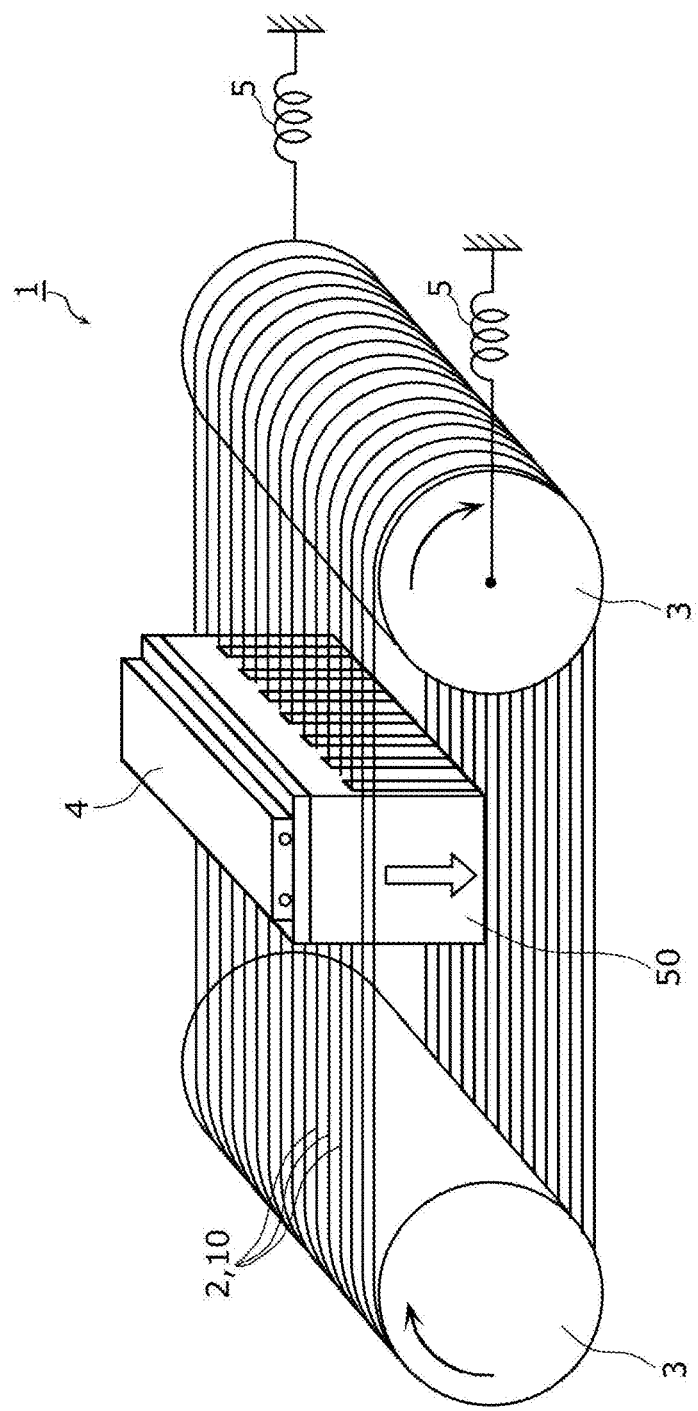
FIG. 8 is a perspective view illustrating a cutting apparatus according to the embodiment.

Tungsten wire 10 according to the present embodiment can be used, for example, as saw wire 2 of cutting apparatus 1 that cuts an object such as a silicon ingot or concrete as illustrated in FIG. 8. FIG. 8 is a perspective view illustrating cutting apparatus 1 according to the present embodiment.

As illustrated in FIG. 8, cutting apparatus 1 is a multi-wire saw including saw wire 2. Cutting apparatus 1 produces wafers by, for example, cutting ingot 50 into thin slices. Ingot 50 is, for instance, a silicon ingot including single-crystal silicon. More specifically, cutting apparatus 1 simultaneously produces a plurality of silicon wafers by slicing ingot 50 using a plurality of saw wires 2.

It should be noted that ingot 50 is a silicon ingot but is not limited to such. For example, an ingot including other substance such as silicon carbide or sapphire may be employed. Alternatively, an object to be cut by cutting apparatus 1 may be concrete, glass, etc.

According to the present embodiment, saw wire 2 includes tungsten wire 10. More specifically, saw wire 2 is quite simply tungsten wire 10 according to the present embodiment. Alternatively, saw wire 2 may include tungsten wire 10 and a plurality of abrasive particles included in a surface of tungsten wire 10.

As illustrated in FIG. 8, cutting apparatus 1 further includes two guide rollers 3, ingot holder 4, and tension releasing device 5.

A single saw wire 2 is looped multiple times over and across two guide rollers 3. Here, for convenience of explanation, one loop of saw wire 2 is regarded as one saw wire 2, and it is assumed that a plurality of saw wires 2 are looped over and across two guide rollers 3. Stated differently, in the description below, the plurality of saw wires 2 form a single continuous saw wire 2. It should be noted that the plurality of saw wires 2 may be a plurality of saw wires that are separated from one another.

Each of the two guide rollers 3 rotates in a state in which the plurality of saw wires 2 are straightly tightened with a predetermined tension, and thereby causes the plurality of saw wires 2 to rotate at a predetermined speed. The plurality of saw wires 2 are disposed in parallel to one another and are equally spaced. More specifically, each of the two guide rollers 3 is provided with grooves positioned at predetermined intervals for saw wires 2 to fit in. The intervals between the grooves are determined according to the thickness of the wafers desired to be sliced off. The width of the groove is substantially the same as diameter φ of saw wire 2.

It should be noted that cutting apparatus 1 may include three or more guide rollers 3. Saw wires 2 may be looped over and across the three or more guide rollers 3.

Ingot holder 4 holds ingot 50 which is an object to be cut. Ingot holder 4 pushes ingot 50 through saw wires 2, and thereby ingot 50 is sliced by saw wires 2.

Tension releasing device 5 is a device that releases tension exerted on saw wire 2. Tension releasing device 5 is, for example, an elastic body such as a coiled or plate spring. As illustrated in FIG. 8, tension releasing device 5 that is a coiled spring, for example, has one end connected to guide roller 3 and the other end fixed to a predetermined wall surface. Tension releasing device 5 is capable of releasing the tension exerted on saw wire 2, by adjusting the position of guide roller 3.

It should be noted that, although not illustrated in the diagram, cutting apparatus 1 may be a cutting apparatus of a free abrasive particle type, and may include a feeder that feeds slurry to saw wires 2. The slurry is a cutting fluid such as a coolant including abrasive particles dispersed therein. The abrasive particles included in the slurry are fixed to saw wire 2, and thereby it is possible to easily cut ingot 50.

Saw wire 2 including tungsten wire 10 having a high tensile strength can be looped over and across guide rollers 3 with a strong tension. Accordingly, vibrations of saw wire 2 caused during the process of cutting ingot 50 are inhibited, and thus it is possible to reduce the kerf loss of ingot 50.

It should be noted that tungsten wire 10 can be used also as a metal mesh such as a screen mesh for screen printing. For example, such a screen mesh includes a plurality of tungsten wires 10 woven as warp and weft yarns.

In addition, tungsten wire 10 can be used also as a medical needle or an inspection needle. Furthermore, tungsten wire 10 can be used also as, for example, a reinforcement wire for an elastic component such as a tire, a conveyer belt, or a catheter. For example, a tire includes a plurality of tungsten wires 10 bundled in layers as a belt or carcass ply.

Others

Although the tungsten wire and saw wire according to the present invention has been described thus far, based on the above-described embodiment, the present invention is not limited to the above-described embodiment.

For example, the metal contained in the tungsten alloy need not be rhenium. The tungsten alloy may be an alloy of tungsten and metal of at least one type different from tungsten. The metal different from tungsten is, for example, a transition metal, such as iridium (Ir), ruthenium (Ru), or osmium (Os). The content of the metal different from tungsten is, for example, at least 0.1 wt % and at most 10 wt %, but is not limited to this example. For example, the content of the metal different from tungsten also may be less than 0.1 wt % or may be greater than 10 wt %. The same holds true for rhenium.

In addition, for example, tungsten wire 10 may contain tungsten doped with potassium (K). Potassium in tungsten wire 10 is present in the grain boundaries of tungsten. A tungsten content of tungsten wire 10 is, for example, at least 99 wt %.

A potassium content of tungsten wire 10 is at most 0.01 wt %, but is not limited to this example. For example, the potassium content of tungsten wire 10 may be at least 0.005 wt % and at most 0.010 wt %.

The diameter, elastic modulus, and tensile strength of the tungsten wire containing potassium-doped tungsten (i.e., potassium-doped tungsten wire) are equivalent to those of the above-described embodiment. In addition, at least one of the average width of surface crystal grains, the average crystal grain size, or the secondary recrystallization temperature is also equivalent to that of the above-described embodiment. The crystal grain size is larger in periphery portion 32 than in center portion 31 by at least 5%, in the cross section perpendicular to axis P of the potassium-doped tungsten wire.

As described above, since the tungsten wire contains a subtle amount of potassium, crystal grain growth in the radial direction of the tungsten wire is inhibited. In other words, since the width of the surface crystal grains can be reduced, it is possible to increase the tensile strength.

The potassium-doped tungsten wire can be manufactured through a manufacturing method equivalent to the manufacturing method of the embodiment, by using a doped tungsten powder doped with potassium instead of a tungsten powder.

In addition, for example, the surface of tungsten wire 10 may be coated by an oxide film, a nitride film, or the like.

It should be noted that the present invention also includes other forms in which various modifications apparent to those skilled in the art are applied to the embodiment or forms in which structural components and functions in the embodiment are arbitrarily combined within the scope of the present invention.

The invention claimed is:

1. A tungsten wire containing tungsten or a tungsten alloy, wherein an average width of surface crystal grains in a direction perpendicular to an axis of the tungsten wire is at most 76 nm,
a tensile strength of the tungsten wire is greater than 5000 MPa, and
a diameter of the tungsten wire is at most 100 μm.

2. A tungsten wire containing tungsten or a tungsten alloy, wherein an average crystal grain size in a cross section perpendicular to an axis of the tungsten wire is at most 0.16 μm,
the average crystal grain size in the cross section is smaller in a periphery portion than in a center portion by at least 5%, the periphery portion being outside the center portion in the cross section,
a tensile strength of the tungsten wire is greater than 5000 MPa, and
a diameter of the tungsten wire is at most 100 μm.

3. The tungsten wire according to claim 1, wherein a secondary recrystallization temperature of the tungsten wire is at least 2200 degrees Celsius.

4. The tungsten wire according to claim 1, wherein a tungsten content of the tungsten wire is at least 90 wt %.

5. A saw wire, comprising:
the tungsten wire according to claim 1.

* * * * *